No. 754,388. PATENTED MAR. 8, 1904.
R. W. O. REHMENKLAU.
ANTIFRICTION BEARING FOR WATER WHEELS.
APPLICATION FILED OCT. 3, 1903.
NO MODEL.
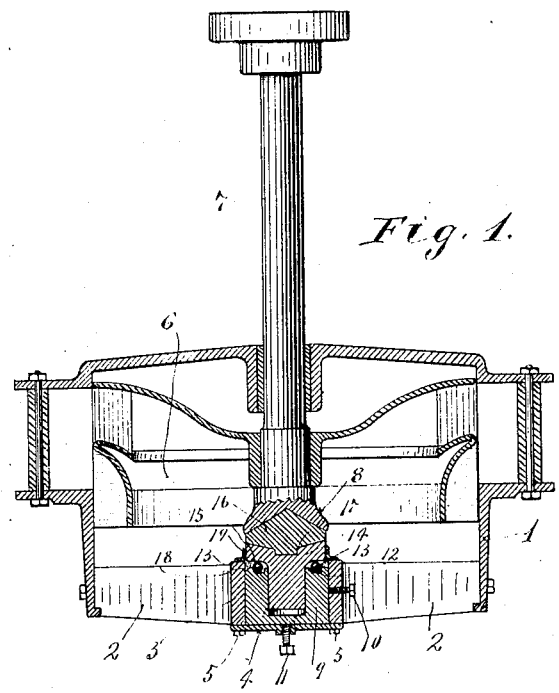
Fig. 1.
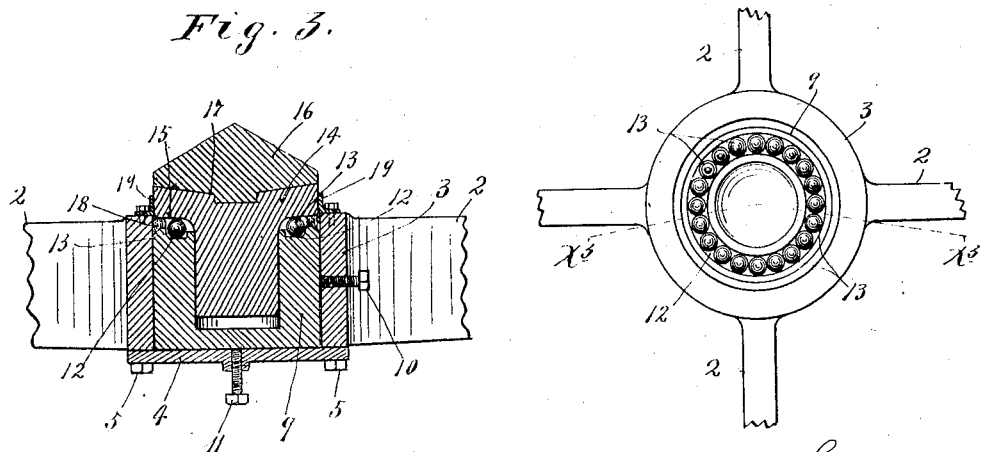
Fig. 3.
Fig. 2.
Witnesses
A. H. Opsahl.
R. C. Mabry.
Inventor.
R. W. O. Rehmenklau
By his Attorneys.
Williamson & Merchant No. 754,388. Patented March 8, 1904.

UNITED STATES PATENT OFFICE.

RUDOLPH W. O. REHMENKLAU, OF MINNEAPOLIS, MINNESOTA, ASSIGNOR OF ONE-HALF TO JAS. F. WILLIAMSON, OF MINNEAPOLIS, MINNESOTA.

ANTIFRICTION-BEARING FOR WATER-WHEELS.

SPECIFICATION forming part of Letters Patent No. 754,388, dated March 8, 1904.

Application filed October 3, 1903. Serial No. 175,541. (No model.)

*To all whom it may concern:*

Be it known that I, RUDOLPH W. O. REHMENKLAU, a citizen of the United States, residing at Minneapolis, in the county of Hennepin and State of Minnesota, have invented certain new and useful Improvements in Antifriction-Bearings for Water-Wheels; and I do hereby declare the following to be a full, clear, and exact description of the invention, such as will enable others skilled in the art to which it appertains to make and use the same.

My invention has for its especial object to provide an improved bearing for upright water-wheels of the turbine type; and to this end it consists of the novel devices and combinations of devices hereinafter described, and defined in the claims. As is a well-known fact to all persons familiar with the subject the bearings or steps of water-wheels of this type are not only subject to the weight of the water-wheel and its shaft, but are also subject to the weight of the column of water which presses upon the wheel. This aggregate weight, where the head of the water is high, is very great.
The most satisfactory construction hitherto designed as a bearing for water-wheels of the above character and the construction which is now almost universally employed consists in providing the bearing-toe of the wheel with a concave, usually conical, bearing-surface and providing the base of support for the wheel or the fixed member of the bearing with a bearing block or step constructed usually of lignum-vitæ wood and having at its upper end a conical or convex bearing-surface that fits the concave toe of the wheel. It is a well-known fact that a very large part, estimated at twenty-five per cent., of the actual power of the water on the wheel is lost in overcoming the friction between the conical bearings of the wheel-toe and the wooden step.

Where the available water-supply is limited and increased power is desired to increase the capacity of a mill and where economy in the use of water is an important item, water-wheels of the highest possible efficiency are demanded. Hence a great many mills hitherto equipped with upright turbines have had substituted therefor at great expense what are known as "horizontal-twin" turbines.

My invention has for its particular object to provide an antifriction-bearing for upright water-wheels of the turbine type whereby turbines of this type may be given at least as high efficiency as turbines of the so-called "horizontal-twin-wheel" type or any other type, to provide an antifriction-bearing which may be very quickly and at a small cost applied to upright turbines as they are found in general use, and to so mount the turbine or water-wheel that it will under normal conditions run on its antifriction-bearing, but in case of disablement of said antifriction-bearing may continue to run on its usual or other suitable frictional bearing or step.

The invention applied as a bearing to an upright turbine is illustrated in the accompanying drawings, wherein—

Figure 1 is a view principally in vertical section, but with some parts shown in full. Fig. 2 is a detail in plan showing a portion of the supporting-spider and showing certain parts of the improved bearing, and Fig. 3 is a detail showing the improved bearing sectioned on the line $x^3$ $x^3$ of Fig. 2.

Like characters indicate like parts throughout the several views.

The wheel-case 1 is rigidly secured to a supporting-spider 2, having a centrally-located hub 3. The case 1 and spider 2 are, as shown, of standard construction and will be anchored in the usual way. The lower end of the hub 3 is closed by a bearing-plate 4, which, as shown, is detachably secured thereto by screws 5.
The water-wheel 6, which is also of standard construction, works, of course, within the case 1, and its shaft 7 is formed at its lower end with a so-called "bearing-toe" 8, which toe is an expanded portion of said shaft formed with a conical depression.

The construction so far described is that of a standard upright water-wheel of the turbine type, and to complete this standard construction a conical pointed step of lignum-vitæ or similar wood would be mounted in the hub of the spider 2, being usually directly held by a metallic thimble. In accordance with my invention, however, I shorten the lignum-vitæ step or conical bearing, mount the same on the rotary member of an antifriction-bearing device, place the non-rotary member of said bearing within the hub of the spider 2, and interpose bearing-balls between the said two members of the antifriction-bearing.

Of the parts of the antifriction-bearing the numeral 9 indicates the cup-shaped metallic thimble, which fits within the hub of the spider 2 and is conveniently held against rotation by a set-screw 10. Another set-screw 11, which works through the bearing-plate 4, engages the bottom of the thimble 9 and serves to vertically adjust the same. On its upper edge the thimble 9 is formed with an annular groove 12, which constitutes a runway for a plurality of closely-positioned bearing-balls 13. The movable member 14 of the antifriction-bearing has a reduced portion that fits within the thimble 9 and has a projecting portion affording an annular shoulder 15, that rests upon the bearing-balls 13.

The numeral 16 indicates the lignum-vitæ block, the upper face which is conical to fit the conical depression of the bearing-toe 8 of the wheel. The lower face of the block 16 is fitted into a suitable seat 17, formed in the upper portion of the member 14. This seat 17 is preferably formed slightly conical, so that under the weight of the load the block 16 will not be split, but will be crowded in a more compact form by the two conical surfaces that engage it. The parts 14 and 16, if held against rotation, would correspond to the so-called "step" or fixed bearing of the standard turbine construction.

In applying this antifriction-bearing all the available space between the members 9 and 14 is filled with lubricating-oil, and an annular packing 18 is placed between the adjacent peripheral portions of the said two members. Where the hub of the spider 2 is not deep enough to overlap with the projecting upper end portion of the rotary member 14, an annular hub-extending flange or ring 19 is secured to the said hub to hold the packing in position and form a quite tight joint with the said member 14.

The operation of the bearing above described is as follows: The comparatively great friction between the block 16 and the bearing-toe of the wheel will cause the members 14 and 16 to rotate with the wheel as if formed as part of its shaft 7, so that under normal conditions the wheel will run upon the antifriction-bearing—to wit, upon the bearing-balls 19. If, however, anything should happen, such as the breaking of a ball, and this should lock the rotary member 14 against rotation or make the rotation thereof possible only under such friction as might weld or otherwise destroy the running parts of said antifriction-bearing, then the wheel finds itself free to rotate on the conical block or step 16, and may in this case run under conditions just as favorable as those under which similar wheels mounted in the usual way are caused to run. The disablement of the ball-bearing device will instantly make itself apparent by the decreased power of the water-wheel, and repairs can then be made at an opportune time, but not necessarily immediately.

An antifriction or ball bearing device applied as above described will be very seldom rendered inoperative; but it is of the greatest importance that the breakage or disablement of such antifriction-bearings will not disable the wheel or cause damage thereto.

By the application of the antifrictional bearing to the water-wheel I believe I am able to effect a gain of approximately twenty-five per cent. in the efficiency of a wheel over the efficiency of the same wheel mounted in the usual way, as above described.

It will of course be understood from the foregoing description and statements made that the bearing above described is capable of a large range of modification within the scope of my invention as herein set forth and claimed.

The expression "antifriction-bearing" is of course intended to include roller-bearings as well as ball-bearings. In fact, the terms "bearing-balls" and "bearing-rollers" might be herein used synonymously. By "frictional bearing" I of course mean bearings in which the engaging surfaces slide frictionally one over the other as distinguished from "antifrictional bearings" in which rolling parts are interposed between the surfaces which press upon them.

What I claim, and desire to secure by Letters Patent of the United States, is as follows:

1. The combination with a body set to rotate on a vertical axis and having a concaved bearing-toe, of an antifriction-bearing involving a rotary member, a non-rotary member, and interposed bearing-balls, said rotary bearing member having a depressed seat in its upper end, and a friction-bearing involving a wooden block fitting the depressed seat in the said rotary bearing member and fitting the concave bearing-toe of said rotary body, substantially as described.

2. The combination with a rotary body set to rotate on a vertical axis and having the concaved bearing-toe 8, of the antifriction-bearing involving the non-rotary thimble 9, the shoulder rotary member 14, having a depressed seat in its upper end, and interposed bearing-balls 9, and a friction-bearing involving the wooden block 16 formed conical both at its upper and lower portions, its upper conical portion fitting the concaved toe 8 of said rotary body, and its lower conical portion fitting the concaved seat of said bearing member 14; substantially as described.

3. The combination with a body set to rotate on a vertical axis and having a concaved bearing-toe, of an antifriction-bearing involving a rotary member, a non-rotary member, and interposed bearing-balls, and a friction-bearing involving a wooden block fitting the concave bearing-toe of said rotary body and fitting the upper face of said rotary bearing member, substantially as described.

In testimony whereof I affix my signature in presence of two witnesses.

RUDOLPH W. O. REHMENKLAU.

Witnesses:
  E. H. KELIHER,
  F. D. MERCHANT.